United States Patent
Sharma et al.

(10) Patent No.: US 8,811,408 B2
(45) Date of Patent: Aug. 19, 2014

(54) ROUTING DATA PACKETS ON A NETWORK

(75) Inventors: Puneet Sharma, Palo Alto, CA (US);
Tianxiong Ji, Mountain View, CA (US);
Zhikui Wang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 149 days.

(21) Appl. No.: 13/460,132

(22) Filed: Apr. 30, 2012

(65) Prior Publication Data
US 2013/0287033 A1 Oct. 31, 2013

(51) Int. Cl.
*H04L 12/28* (2006.01)
*H04L 12/56* (2006.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ...... 370/395.53; 370/235; 370/236; 370/237; 370/238

(58) Field of Classification Search
None
See application file for complete search history.

(56) References Cited

U.S. PATENT DOCUMENTS

| | | | |
|---|---|---|---|
| 6,973,032 B1 | 12/2005 | Casley et al. | |
| 7,349,343 B2 * | 3/2008 | Shipman | 370/236 |
| 7,453,810 B2 | 11/2008 | Zoranovic et al. | |
| 7,697,432 B2 | 4/2010 | Yu et al. | |
| 7,912,003 B2 | 3/2011 | Radunovic et al. | |
| 2006/0159019 A1 * | 7/2006 | Buskirk et al. | 370/235 |
| 2008/0310417 A1 * | 12/2008 | Friskney et al. | 370/392 |
| 2011/0206047 A1 * | 8/2011 | Donthamsetty et al. | 370/392 |

FOREIGN PATENT DOCUMENTS

EP  1843532 A1  10/2007

OTHER PUBLICATIONS

Radunović et al., "An Optimization Framework for Opportunistic Multipath Routing in Wireless Mesh Networks," Found at URL <http://research.mirosoft.com/en-us/um/people/bozidar/Publications/infocom08_mc2.pdf>, INFOCOM 2008. The 27th Conference on Computer Communications. IEEE, Apr. 13-18, 2008, pp. 2252-2260.

Athanasopoulou et al., "Backpressure-based Packet-by-Packet Adaptive Routing in Communication Networks," Cornell University Library, downloaded from the internet URL <http://arxiv.org/pdf/1005.4984v1.pdf>, May 27, 2010.

* cited by examiner

*Primary Examiner* — Hassan Phillips
*Assistant Examiner* — Lonnie Sweet

(57) ABSTRACT

A plurality of data flows can be routed from a first node of the network to one or more other nodes of the network. A destination of a data packet for each data flow is determined. When the destination node of the data packet of that data flow is not adjacent to the first node, a probabilistic determination is made for a next hop of data packets of that data flow. When the destination node of the data packet of that data flow is adjacent to the first node, a priority designation is made for the next hop of data packets of that data flow as being the destination node. The next hop for data packets of the data flow is determined based on either the probabilistic determination or the priority designation.

15 Claims, 6 Drawing Sheets

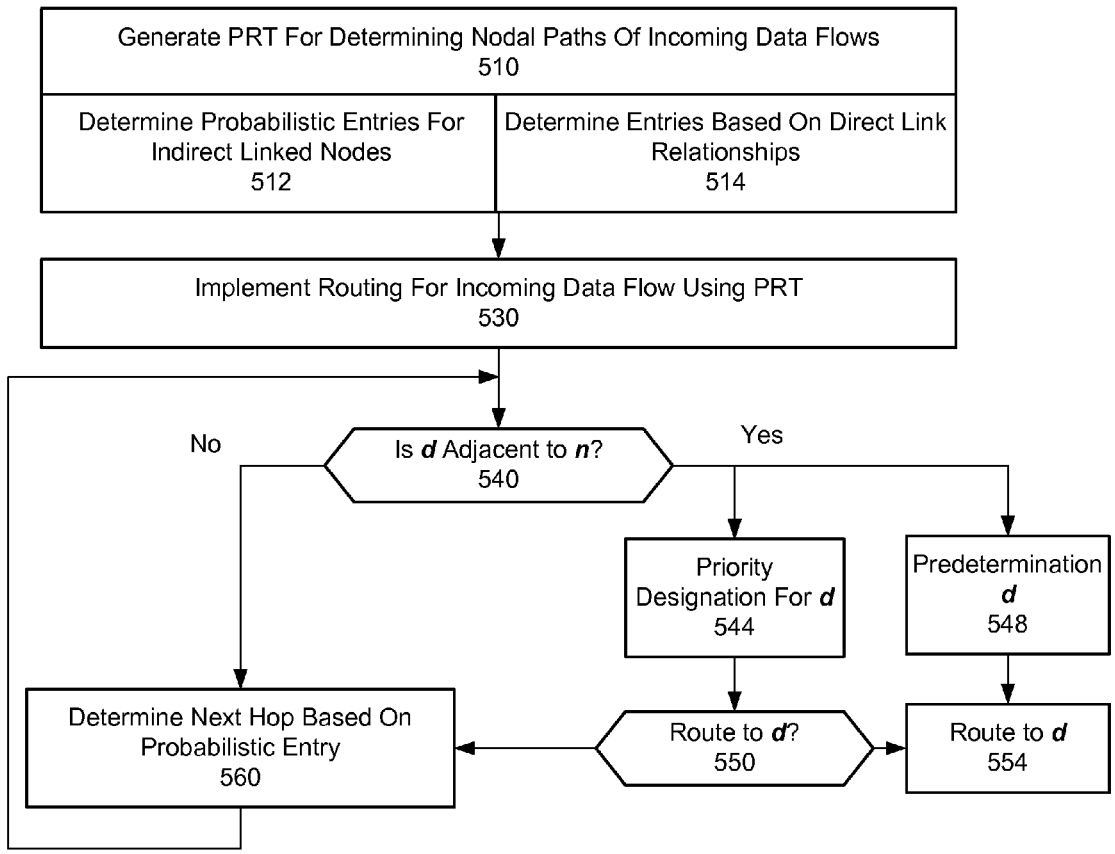
FIG. 5
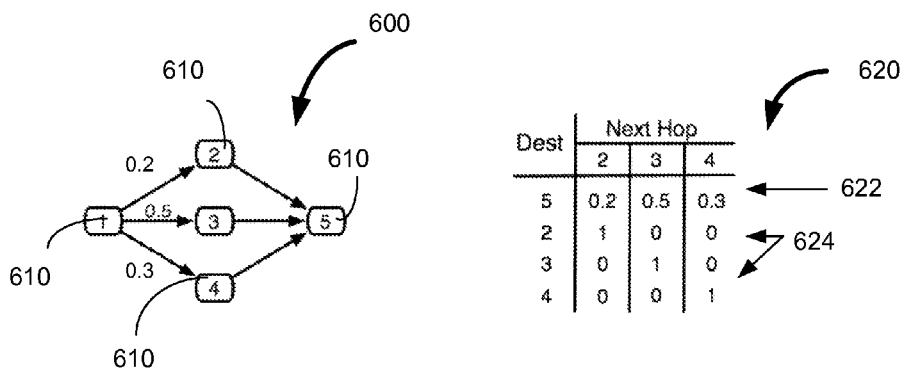
FIG. 6A
Hybrid PRT at node 1
FIG. 6B

ROUTING DATA PACKETS ON A NETWORK

BACKGROUND

Routing in networks such as data centers has become increasingly more important. Various logical data center topologies and algorithms have been developed over the years in order to enhance performance and manageability. Challenges for such topologies and algorithms include cost and performance.

BRIEF DESCRIPTION OF THE DRAWINGS

FIG. 5 illustrates an example probabilistic method for routing a data flow on a network with consideration for proximity amongst nodes, under an embodiment.

FIG. 6A and FIG. 6B illustrate examples of a probabilistic routing table, under an embodiment.

DETAILED DESCRIPTION

Figure 1:
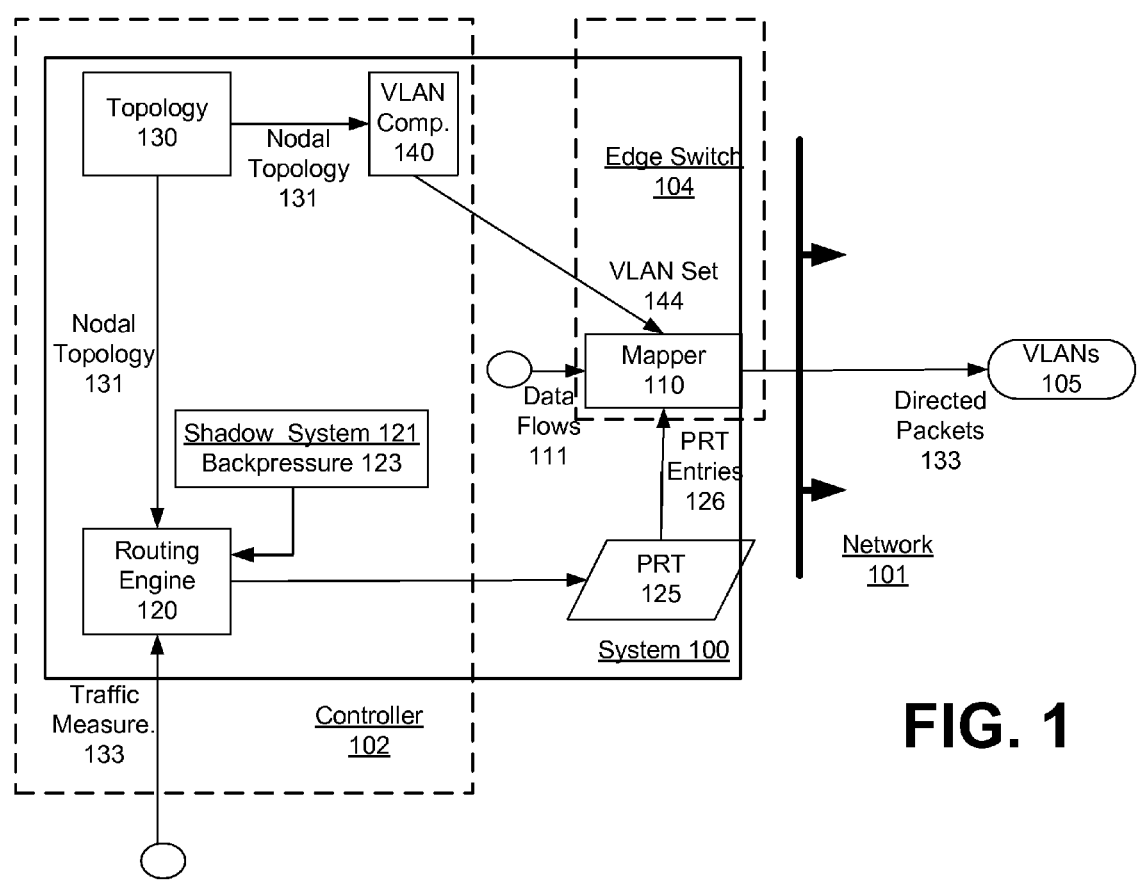
FIG. 1 illustrates an example system for routing a flow on a network, according to one or more embodiments.

Embodiments described herein include a system or method for routing data packets in a network using probabilistic determinations. In an embodiment, a set of virtual local area networks (VLANs) are defined from a set of nodes that form a network. A set of possible paths are determined for routing data packets from a source node to one or more other nodes of the set of nodes. A set of probabilistic values are identified for determining a path in the set of possible paths that individual data packets are to take as between the source node and a destination node specified by the individual data packet. The individual data packets are routed to the destination node specified by that data packet, along a path that is determined by use of the set of probabilistic values. The path may be provided by one or more of the VLANs in the set.

Some embodiments also include an edge node that identifies a set of virtual local area networks (VLANs) that are defined from a set of nodes of a network. The edge node routes the data packets of a flow to a destination node specified by that data packet, along a path that is determined by use of the set of probabilistic values. The path may be provided by one or more VLANs.

In variations, a system includes an edge node and a controller that includes a routing engine. The routing engine generates a set of probabilistic values, used by the edge node in order to route a data flow.

As used herein, an edge node can be provided on an edge switch, host or other device.

Further, topology for a network of nodes includes multiple network paths, including one or more trees.

Among other benefits, one or more embodiments described herein provide path diversity and high bisection bandwidth between source and destination nodes of a network, such as a data center network.

Embodiments recognize that many networks can be supported by a set of VLANs, which can provide multiple paths between the same source destination pair of nodes. By distributing traffic onto VLANs, traffic directed to a particular destination can be distributed on multiple paths. In order to efficiently utilize VLANs on a network, some embodiments described herein provide for the use of probabilistic routing entries that determine the next hop(s) for a data flow, prior to packet arrival at the destination.

According to one or more embodiments, a probabilistic routing table (PRT) is incorporated for use on an edge node of a network. The edge node utilizes the PRT to determine optimal routes for flows, based on considerations such as data packet distribution and/or reduced link usage.

Additionally, in some embodiments, a topology of the data center network is determined, the topology including a set of nodes of the data center network, including a source node. A set of probabilistic values are determined for determining a path in a set of possible paths that individual data packets are to take as between the source node and a destination node in the set of nodes. The set of probabilistic values may be based at least in part on a determination of data center network traffic amongst the individual nodes. A probabilistic routing table is generated that includes, for at least a given node in the set of nodes, (i) a first set of entries that includes probabilistic determinations for a next hop from that node when the next hop is not a specified destination node for a data flow, and (ii) a second set of entries that includes priority designations or predeterminations for the next hop as being an adjacent node when the adjacent node is the specified destination node for the data flow. Data packets of a flow are routed using the probabilistic routing table.

A flow refers to a set of data packets that originate from a same source, usually as a result of a common application operation or resource. Generally, the routing characteristics of a flow are applicable to the data packets that form the flow.

A probabilistic routing table lists probabilities for choosing a next hop for a packet that is directed to a given destination on a network.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

System Description

FIG. 1 illustrates an example system for routing a flow on a network, according to one or more embodiments. A system 100 such as described with FIG. 1 can be implemented to manage the operation of a network 101 (e.g., data center network). The system 100 can include a mapper 110, a routing engine 120, a topology component 130, and a VLAN generation component 140. In implementation, the network 101 can include one or more servers, interconnected by a combination of switching elements or nodes. One or more VLANs 105 can be defined on the network 101, for transferring of data packets from one node to the next within the network.

One or more embodiments provide for system 100 to be implemented through a controller 102 and an edge node 104. However, the functionality described with system 100 can be distributed or shared amongst multiple or alternative components. For example, in variations, multiple edge nodes 104 may be employed to implement a system such as described. Additionally, functionality described as being part of the controller 102 can be implemented in part or whole through other devices. For example, the controller 102 and edge node 104 can be provided on a common device.

According to an embodiment, the mapper 110 operates to route incoming data flows 111 (or packets that form the data flow) through the network 101. In the example shown, the mapper 110 is implemented on edge switch 104. In routing the flow 111, mapper 110 can implement processes such as described by, for example, an embodiment of FIG. 2, FIG. 3A or FIG. 3B. In variations, mapper 110 implements a process such as described with an embodiment of FIG. 5.

The routing engine 120 can be implemented on the controller 102 of the network 101. Among other functions, the routing engine 120 can determine a probabilistic routing table (PRT) 125 (or other set of probabilistic values) for purpose of routing packets from the edge switch 104 through the network 101. The routing engine 120 may utilize traffic measurements 133 to generate the PRT 125. The PRT 125 can have different forms and formats. In one implementation, the PRT 125 lists a probability for each node as to every other node being a next hop. In variations, the PRT 125 also identifies the probabilities as between each node and a next node based on a destination node for the incoming data packet.

In some embodiments, the routing engine 120 implements a shadow system 121 to emulate the traffic that is encountered by the network 101. In particular, the routing engine 120 can model the behavior of the network 101 through use of the traffic measurements 133. The routing engine 120 generates entries for the PRT 125 based on results of the emulation. The shadow system 121 can emulate various facets of traffic handling at network 101, including emulating queues, packets, and counters. In some implementations, the routing engine 120 can implement the shadow system 121 using an iterative algorithm that seeks optimal traffic distribution. In one embodiment, the shadow system 121 emulates the traffic pattern of the network 101 using a backpressure algorithm 123. An example of a backpressure algorithm for some embodiments is described with Equation (1), below.

The PRT 125 can include probabilistic values 126 for determining the data path that a data flow is to take when routed to a destination node in the network. In particular, the PRT 125 sets probability values 126 for determining the next hop of an incoming data packet at each node in the network. The PRT table 125 can be generated to determine optimal routes for data flows based on minimizing network link usage. An example of PRT table 125 is shown with FIG. 6A and FIG. 6B.

The topology component 130 identifies a nodal topology 131 for the network 101, defining how various nodes (e.g., switches) of the network are connected. The topology 131 may be used by the routing engine 120 in generating the PRT 125. The topology 131 can also be used by the VLAN generation component 140 to form the VLAN set 144 of the network 101. In some embodiments, the mapper 110 uses the PRT table 125 to route data flows 111 onto VLANs 105 of the VLAN set 144. The individual VLANs 105 can each include a spanning tree that enables data packets of data flows 111 to traverse from node to node within the network 101.

Probabilistic Multi-Path Routing

Figure 2:
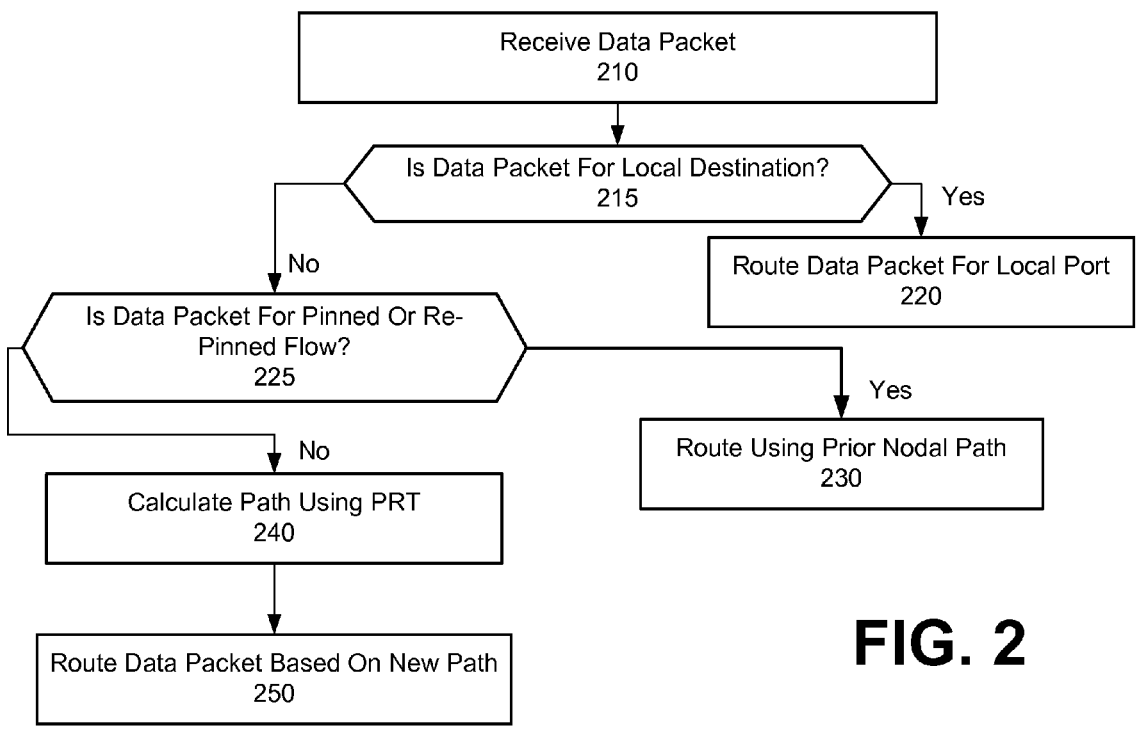
FIG. 2 illustrates an example method for probabilistically routing a data flow on a network, under an embodiment.

FIG. 2 illustrates an example method for probabilistically routing a data flow on a network, under an embodiment. A method such as described by an example of FIG. 2 may be implemented using components such as described by an example of FIG. 1. Accordingly, reference may be made to components of FIG. 1 for purpose of illustrating a suitable component for performing a step or sub-step being described.

In an embodiment, edge switch 104 receives a data packet that is part of a data flow (210). The edge switch 104 makes a determination as to whether the data packet is for a local or remote destination (215). If the data packet is for a local destination, the edge switch 104 routes the data flow to a local port identified for the destination (220). If, on the other hand, the data packet is for the remote destination, another determination is made as to whether the data flow of the packet is pinned (225), or re-pinned (e.g., for elephant flows). The determination that the data flow is pinned means that the route for the data flow (and packets that form the data flow) has already been determined. If the data packet is part of a data flow that is pinned, the data packet is routed using the prior nodal path determined for the data flow (230).

If the data flow is not pinned, the edge switch 104 determines a nodal path using the PRT 125 (240). Alternatively, the edge switch 104 can determine that a particular data flow needs to be repinned. The new nodal path is thus determined through a series of probabilistic determinations, provided through entries of the PRT 125. The nodal path that is identified can include or correspond to the selection of the VLAN 105 that the edge switch 104 uses to route the data flow to its destination. The data packet and flow are then routed onto the network 101 using the selected nodal path (e.g., selected VLAN 105) (250).

Figure 3A:
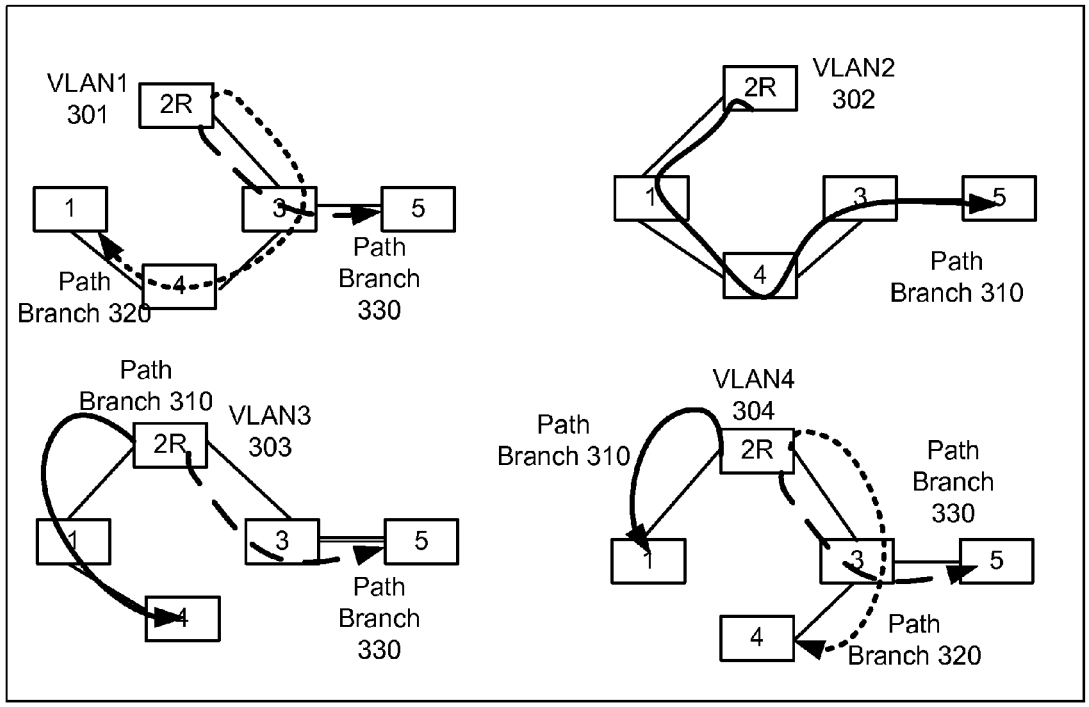
FIG. 3A and FIG. 3B illustrate examples of a probabilistic mufti-path routing scheme for a network, under an embodiment.
Figure 3B:
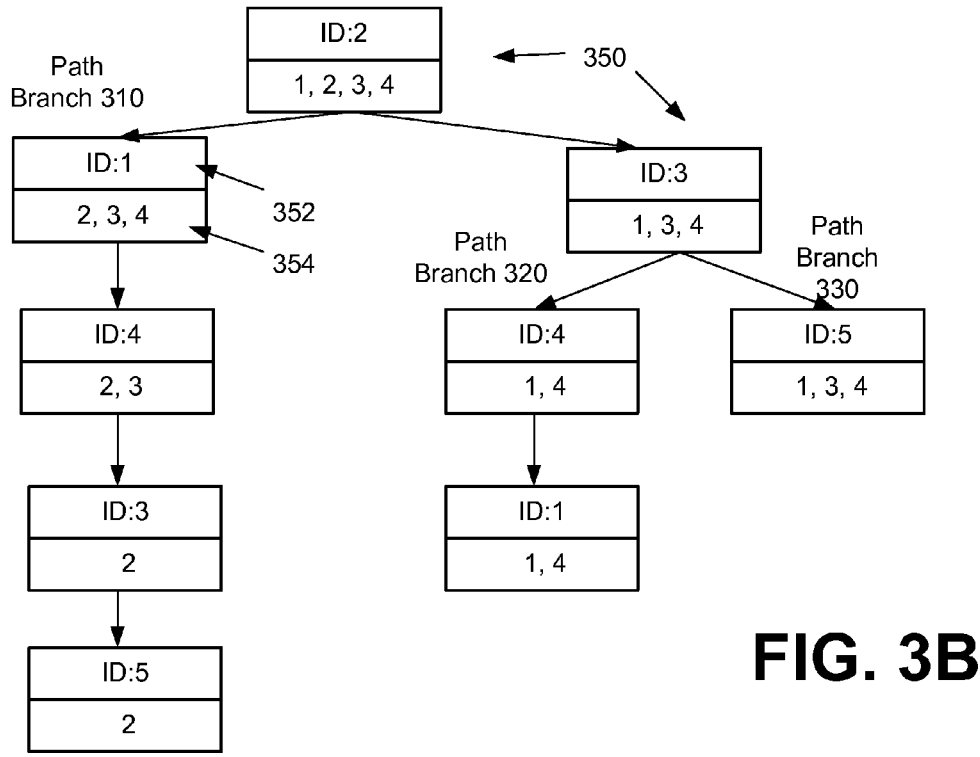

FIG. 3A and FIG. 3B illustrate examples of a probabilistic multi-path routing scheme for a network, under an embodiment. In FIG. 3A, a network topology is shown comprising five nodes (e.g., switches), on which four VLANs 301, 302, 303 and 304 are defined. The VLANs 301-304 are created so that there is a path from a source node (2R) to each node and to every other node in the topology.

With reference to FIG. 3B, the various nodal paths are shown in a tree structure form. In particular, FIG. 3B illustrates a nodal VLAN tree rooted at an edge switch or node of the data center network. Each block 350 includes a node identification 352, beginning with the source node (node 2), and VLAN identification 354. The VLAN identification 354 of each block shows the VLANs 301, 302, 303, 304 that can be used to route the data flows from the source node to a destination corresponding to the node of that block. In the examples provided by FIG. 3A and FIG. 3B, path branch 310 extends from the source node (node 2) to nodes 1→4→3→5. To route from node 2 to node 1 on path branch 310 (where node 1 is next hop), VLAN 2, 3 or 4 can be used. To route from node 2 to node 4 on path branch 310, VLAN 2 and 3 can be used. To route from node 2 to node 3 or 5, VLAN 2 can be used.

Similarly, path branch 320 extends from the source node (node 2) to nodes 3→4→1, and path branch 330 extends from the source node (node 2) to nodes 3→5. To route from node 2 to node 3 on path branch 320, VLAN 1, 3 or 4 can be used. To route from node 2 to node 4 or node 1 on path branch 320, VLAN 1 or 4 can be used. And to route from node 2 to node 5 on path branch 330, VLAN 1, 3 or 4 can be used.

The determinations as to which path should be taken at, for example, node 2 (e.g., path branch 310, 320 or 330), or at node 3 (e.g., path branch 320 or 330) can be probabilistic and based on the PRT 125. In embodiments, the PRT 125 can also be implemented to determine the next hop for each data flow at each node, so that some portion of the data flow may not follow the nodal paths depicted in FIG. 3A and FIG. 3B. Thus, the PRT 125 might provide values that permit some percentage of data flows to not follow any of the path branches 310, 320, 330 that are provided through the various VLANs. Such embodiments may provide for the use of a default VLAN for instances when the routing scheme would otherwise result in either (i) a data flow being routed to a leaf node prior to reaching its destination, or (ii) the data flow being routed to an intermediate node when the outcome of the PRT results in a node identifier that does not exist in the intermediate node's path branch.

The examples provided by FIG. 3A and FIG. 3B also illustrate the multi-path nature of the routing scheme. As shown, multiple VLANs can be used to access any node on the network from the source node. For example, node 5 can be accessed from the source node using VLAN 2 (path branch 310) or VLANs 1, 3 and 4 (path branch 330). In some cases, considerations such as weighting the nodal path determination for an outcome of shortest path may be used (e.g., route from node 2 to node 5 using VLAN 1, 3 or 4).

Figure 4:
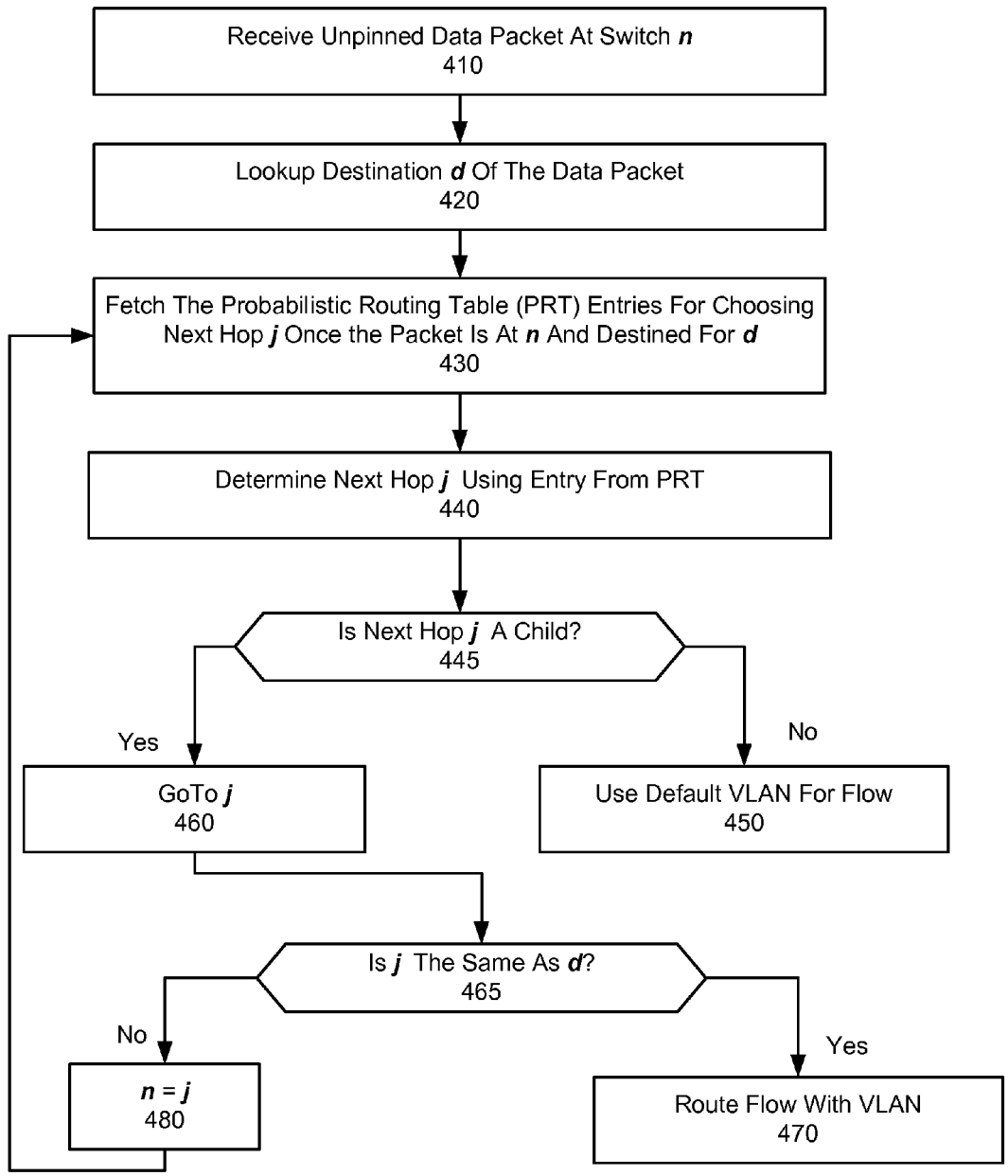
FIG. 4 illustrates an example method for routing a data flow to a destination based on a probabilistic approach, according to an embodiment.

FIG. 4 illustrates an example method for routing a data flow to a destination based on a probabilistic approach, according to an embodiment. A method such as described by an example of FIG. 4 may be implemented using components or elements described with other figures. Accordingly, reference may be made to components of other figures for purpose of illustrating a suitable element or component for performing a step or sub-step being described.

According to embodiments, the mapper 110 (e.g., implemented on edge switch 104 for network) receives unpinned data packets for a flow at its source node n (410). A destination d of the incoming flow is determined (420), and routing is determined along a VLAN tree. The PRT entries are fetched for choosing next hop j on a VLAN tree of the network once the packet is at n and destined for d (430). From the PRT entries, the next hop j is determined for the packet when the packet is at the source node n (440). A determination is then made as to whether the next hop j is a child of the VLAN tree (445). If the next hop j is not a child, then the default VLAN is used for the flow (450). If the next hop j is a child, then the packet is routed for the next hop j (460).

In some embodiments, a determination is made as to whether the node j is the same as the destination node d (465). If the nodes are the same, the destination is reached and the identified VLAN is used to route the flow (470). Otherwise, the current node is iterated (480), and the method is repeated as (430).

Routing with Topology Considerations and Use of Improved Backpressure Algorithm

Embodiments described herein recognized that some conventional approaches for routing data packets onto networks (e.g., data center networks, mesh networks, ad hoc wireless networks etc.) inherently generate paths that are looped or otherwise extended beyond the minimum possible path between source and destination. While using looped or extended paths can provide optimality with respect to distribution of data packets, such extended nodal paths do not optimize from the perspective of minimizing link usage. Some embodiments described herein provide for use of a PRT table that reduces or minimizes link usage when routing data flows on the network.

To reduce link usage while managing distribution of data flows on the network, some embodiments provide for priority routing of data packets in a manner that accounts for proximity amongst nodes in the network topology. More specifically, one or more embodiments provide for routing data packets onto the network using a combination of probabilistic routing entries and consideration of a logical proximity of the destination node.

More specifically, some embodiments avoid use of network paths that are looped or otherwise extended by routing data packets from a first node directly to a destination node when the first node and the destination node are adjacent to one another. In an embodiment, a data packet of a data flow is routed from a first node to a destination node based on either a priority designation or a predetermination, in response to a determination that the destination node of that data packet is adjacent to the first node.

As described with many embodiments, a backpressure algorithm can be used to develop the entries of the PRT, resulting in probabilities as to the paths an individual packet can take to its destination. Many variants of backpressure algorithms exist, and can be used for developing a PRT as described in many examples described herein. Backpressure algorithms can be implemented to seek, for example, shortest-path routing, in order to improve delay performance and bias packet routing to shortest hops.

In some embodiments, a backpressure algorithm is implemented that identifies and prioritizes instances when a next or adjacent hop for a data packet at a given node is also a destination node. One example of a backpressure algorithm for use with some examples provided herein is provided by the following:

$$\min_{\mu} \sum_{(nj) \in \varepsilon} \mu_{nj} - \alpha \sum_{(nd) \in \varepsilon} \mu_{nd}^d \qquad \text{Equation (1)}$$

$$\text{s.t.} \quad f_{nd} + \sum_{(ln) \in \varepsilon} \mu_{ln}^d \leq \sum_{(nj) \in \varepsilon} \mu_{nj}^d,$$

$$\forall d \in \mathcal{D}, n \in \mathcal{V},$$

$$\mu_{nj} \leq 1,$$

$$\forall (nj) \in \varepsilon,$$

In Equation (1), $\mu_{nj}^d$ is the rate allocated on link (n, j) to packets destined for node d, and $\mu_{nj} = \Sigma_{d \in \mathcal{D}} \mu_{nj}^d$ is the total rate allocated on link (n, j). The objective function of Equation (1) is given by, $$\alpha \sum_{(nd) \in \varepsilon} \mu_{nd}^d$$

which is the second term of Equation (1). Equation (1) represents an optimization problem, with an objective to minimize:

$$\Sigma_{(nj) \in \varepsilon} \mu_{nj} - \alpha \Sigma_{(nd) \in \varepsilon} \mu_{nd}^d \qquad \text{Equation (2)}$$

With further reference to Equation (1), the first term refers to the goal of utilizing minimal network resources in routing individual packets. The second term refers to priority designation, or predetermination, given to packets destined for d where packets are logically adjacent (or one hop) from the node d. In other words, for a given node n, if the packet destination is d, and there exists a destination d that is directly connected to the given node, then the objective function (second term of Equation (1)) gives priority to packets destined for destination d.

FIG. 5 illustrates an example probabilistic method for routing a data flow on a network with consideration for logical proximity amongst nodes, under an embodiment. A method such as described by FIG. 5 may be implemented using a system, or components of a system, such as described with other figures. For example, a method such as described may be implemented in part or whole on an edge switch of a data center network. As an alternative, one or more embodiments such as described by FIG. 5 may be implemented on switching resources of other kinds of networks (e.g., mesh network, wireless ad hoc network etc.). Accordingly, reference may be made to components of other figures for purpose of illustrating a suitable element or component for performing a step or sub-step being described.

In embodiments, a PRT is generated (510) that provides for determining paths for incoming data flows. As described below, the paths can also identify a priority designation, or predetermination, given to packets destined for d where packets are logically adjacent (or one hop) from the node d. In some examples, the PRT can include probabilistic entries that determine indirect linked nodes. More specifically, the probabilistic entries can pertain to a portion of a nodal path in which the destination node d is not a direct link (512). For example, with reference to the example of FIG. 3A, probabilistic values may be determined for the PRT 125 for when packets are received at node 4 and destined for node 5, or at node 1 and destined for node 3 or 5. The priority designation or predetermination values can be determined using, for example, the shadow system 121 and implementing, for example, the backpressure algorithm 123 to emulate a traffic pattern of a network. In more specific examples, the PRT 125 with priority designation or predetermination values can be generated using, for example, a backpressure algorithm such as described by Equation (1).

More specifically, the PRT 125 includes entries that are based on direct link relationships (514). For example, the entries of the PRT can identify priority or pre-determined next-hop destination values for portions of nodal paths that extend between directly linked nodes. In some implementations, the priority or pre-determined next-hop destination values can be expressed as certainties, rather than probabilities. For example, certain values (i.e., 0 or 100%) can be provided for entries of the PRT 125 for cases when the data packet is received at node 2 and destined for node 1 or 3.

The PRT is then used to implement routing for incoming data flow (530). The PRT can include entries that reflect priority designation or predeterminations for cases in which the destination node is directly linked. For example, a backpressure algorithm such as described with Equation (1) can be used to generate the PRT.

In one implementation, a data flow is routed by first determining, for a current node n, whether an adjacent node is also the destination node d (540). If the determination is that the current node n is not the destination node d, then a next hop j is determined based on the probabilistic entry of the PRT (560). The next hop j is then set to the current node n and the method is repeated at (540).

Otherwise, in one variation, if the determination is that the current node n is also the destination node d, then either a priority designation or a predetermination is made to route the packet to d. In one implementation, a priority designation is made for routing the data packet to d (544), meaning the probability for routing the packet directly to d is weighted or prioritized so that the outcome is more likely than would otherwise be for other nodes which are not next hops. A determination is made as to whether the data packet is routed to d based on priority designation (550), and the data packet can be routed to d based on the priority designation (554). Else, the next hop can be determined based on probabilistic entry (560), taking into account that d was prioritized.

In a variation, routing the data packet to d can be predetermined (e.g., with certainty) (548), and the data packet is then routed t d (554).

FIG. 6A and FIG. 6B illustrate examples of PRT that is based off of a backpressure algorithm in which predetermination are used for packets destined for d where packets are logically adjacent (or one hop) from the node d, under an embodiment. With reference to FIG. 6A, given a network topology 600 that includes five nodes 610, a PRT 620 (shown for node 1) includes a set of probabilistic entries 622 and a set of predetermined next-hop destination entries 624. As an alternative to predetermined next-hop destination entries, priority entries (e.g., increased probabilities, but not predetermined) can be provided for the entries 624. The set of probabilistic entries 622 define probabilities for the next hop when the path is to extend between node 1 and node 5. The probability values of the probabilistic entries 622 may be based on, for example, emulating the traffic patterns of the network 101 (see example of FIG. 1).

In embodiments, the set of predetermined next-hop destination (e.g., certain) entries 624 force the next hop to be the destination node when the destination node is the adjacent node. Thus, for example, if at node 1, the destination node is node 2, the PRT 620 requires that the next hop be from node 1 to node 2.

The use of priority or predetermined PRT values for instances when the adjacent node is the destination node eliminates the longer or looped paths that could otherwise form when only probabilistic determinations are made as between nodes. Accordingly, the routing of the packets can be optimized in terms of minimizing the number of links used to route data flows to the network.

Hardware Diagram

Figure 7:
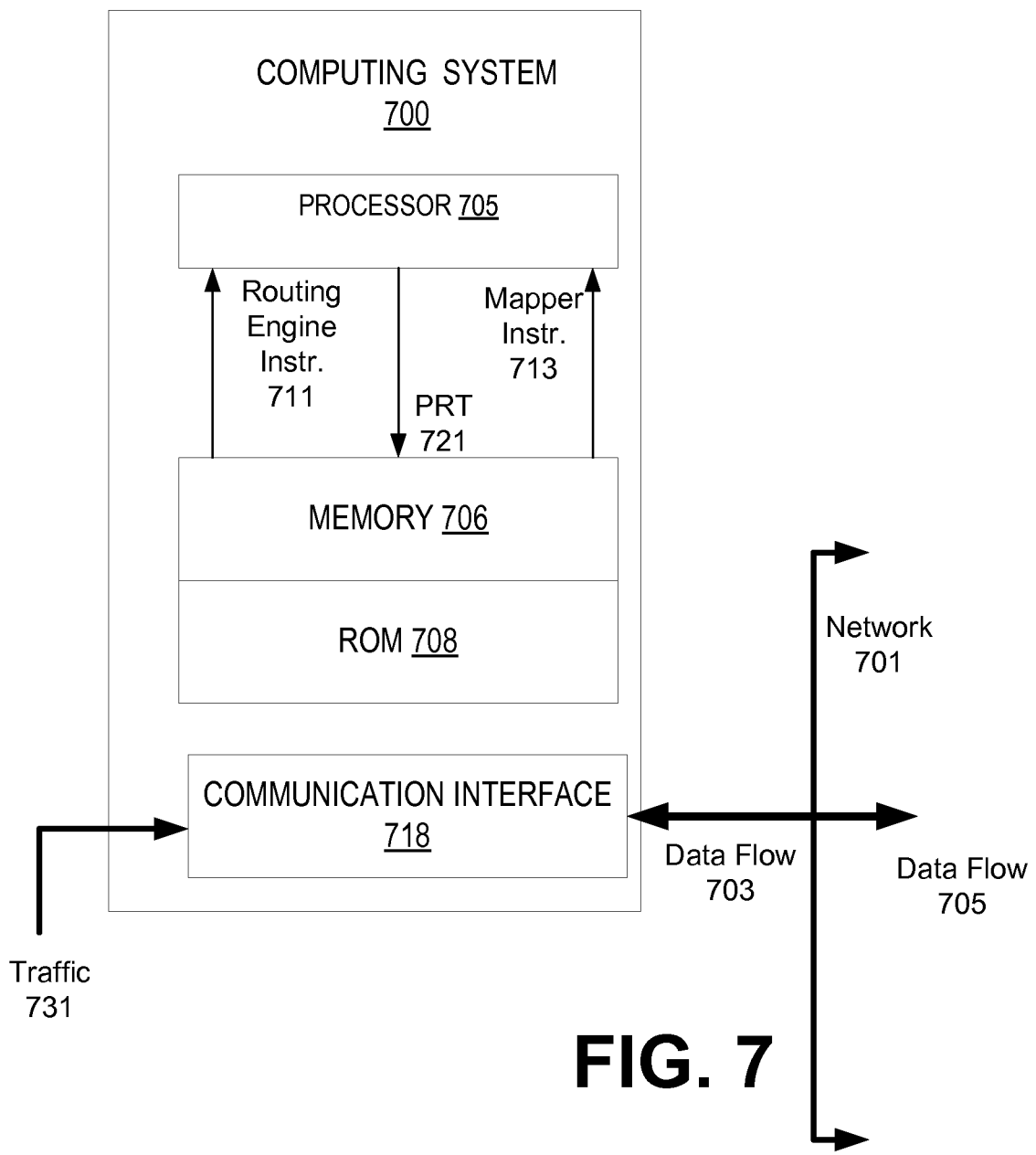
FIG. 7 illustrates an example computing system which can be implemented with or as part of a collaboration system, according to one or more embodiments.

FIG. 7 illustrates an example computing system to implement routing of data flow, according to one or more embodiments. The computing system 700 can correspond to a controller, edge switch or combination device for routing data flow on, for example, a data center network. The computing system 700 includes a processor 705, non-transitory memory 706, and communication interface 718. The memory 706 can store information such as topology information 131 (see FIG. 1), VLAN set 144 (see FIG. 1) or other information for routing data packets onto a network 701. When implemented as a controller 102 (see FIG. 1), the processor 705 can use instructions 711 to implement a routing engine 120 (see FIG. 1) to determine, for example, a set of probabilistic values for routing the data flows 703 onto the network 701. The set of probabilistic values can be stored as, for example, PRT 721 in the memory 706. When implemented as an edge switch 104 (see FIG. 1), the processor 705 can use instructions 713 to implement a mapper 110 (see FIG. 1) to route the data packets of the data flow 703 using the probabilistic values.

The communication interface 718 may enable the computing system 700 to receive network information 731 (e.g., traffic data) for determining the PRT 721. In some implementations, the PRT 721 can be implemented to include priority designations or predeterminations, for use with packets destined for d where packets are logically adjacent (or one hop) from the node d. In variations, the communication interface 718 may enable receipt of incoming flow 703 and transmission of routed flow 705 onto the network 701. In some embodiments, processor 705 providing functionality for routing engine 120 and/or mapper 110 by executing one or more sequences of instructions contained in memory 706. Such instructions may be read into memory 706 from another source, such as from machine-readable medium, or a storage device. Execution of the sequences of instructions contained in memory 706 causes processor 705 to perform operations such as described herein. In alternative embodiments, hardwired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for routing data packets on a network, the method being implemented by one or more processors and comprising:
    routing a plurality of data flows, each of the plurality of data flows being routed from a first node to one or more other nodes of the network;
    wherein routing the plurality of data flows includes:
        (i) determining, for each of the plurality of data flows, whether a nodal path has been predetermined;
        (ii) determining that the nodal path has not been predetermined for at least one of the data flows;
        (iii) for each of the data flows that do not have a predetermined nodal path:
            determining a destination node of a data packet of that data flow,
            determining whether the destination node of that data flow is adjacent to the first node,
            when the destination node of the data packet of that data flow is not adjacent to the first node, making a probabilistic determination for a next hop of data packets of that data flow,
            when the destination node of the data packet of that data flow is adjacent to the first node, making a priority designation for the next hop of data packets of that data flow to be the destination node; and
        determining the next hop for data packets of the data flow based on either the probabilistic determination or the priority designation.

2. The method of claim 1, wherein the priority designation weights the probabilistic determination in favor of the next hop being the destination node.

3. The method of claim 1, further comprising:
    determining a nodal topology of the network; and
    wherein routing the plurality of data flows is based on the nodal topology.

4. The method of claim 1, wherein the steps of making the probabilistic determination and the priority designation include using a backpressure algorithm.

5. The method of claim 4, further comprising:
    generating a probabilistic routing table (PRT) using the backpressure algorithm, and wherein the steps of making the probabilistic determination and the priority designation include using the PRT.

6. The method of claim 1, wherein routing a plurality of data flows is performed on an edge switch.

7. The method of claim 1, further comprising defining a set of virtual local area networks (VLANs) on a set of nodes that comprise the network, and routing the data packets of each of the data flows along a path that is provided by at least one of the VLANs in the set of VLANs.

8. A non-transitory computer-readable medium that stores instructions for routing data packets on a network, the instructions that, when executed by one or more processors, cause the one or more processors to perform operations comprising:
    routing a plurality of data flows, each of the plurality of data flows being routed from a first node to one or more other nodes of the network;
    wherein routing the plurality of data flows includes:
        (i) determining, for each of the plurality of data flows, whether a nodal path has been predetermined;
        (ii) determining that the nodal path has not been predetermined for at least one of the data flows;
        (iii) for each of the data flows that do not have a predetermined nodal path:
            determining a destination node of a data packet of that data flow,
            determining whether the destination node of that data flow is adjacent to the first node,
            when the destination node of the data packet of that data flow is not adjacent to the first node, making a probabilistic determination for a next hop of data packets of that data flow,
            when the destination node of the data packet of that data flow is adjacent to the first node, making a priority designation for the next hop of data packets of that data flow to be the destination node; and
        determining the next hop for data packets of the data flow based on either the probabilistic determination or the priority designation.

9. The computer-readable medium of claim 8, wherein the priority designation weights the probabilistic determination in favor of the next hop being the destination node.

10. The computer-readable medium of claim 8, wherein the instructions further cause the one or more processors to perform operations comprising:
    determining a nodal topology of the network; and
    wherein routing the plurality of data flows is based on the nodal topology.

11. The computer-readable medium of claim 8, wherein the operations of making the probabilistic determination and the priority designation include using a backpressure algorithm.

12. The computer-readable medium of claim 11, wherein the instructions further cause the one or more processors to perform operations comprising:
    generating a probabilistic routing table (PRT) using the backpressure algorithm, and wherein the operations of making the probabilistic determination and the priority designation include using the PRT.

13. The computer-readable medium of claim 8, wherein the operations for routing a plurality of data flows is performed on an edge switch.

14. A network comprising:
    a plurality of nodes, including an edge node;
    wherein the edge node comprises a network interface, a memory resource to store instructions, and one or more processors, wherein the one or more processors execute the instructions to perform operations comprising:
        routing a plurality of data flows, each of the plurality of data flows being routed from the edge node to one or more other nodes of the plurality of nodes:
        wherein routing the plurality of data flows includes:

(i) determining, for each of the plurality of data flows, whether a nodal path has been predetermined;
(ii) determining that the nodal path has not been predetermined for at least one of the data flows;
(iii) for each of the data flows that do not have a predetermined nodal path:
determining a destination node of a data packet of that data flow,
determining whether the destination node of that data flow is adjacent to the first node,
when the destination node of the data packet of that data flow is not adjacent, making a probabilistic determination for a next hop for data packets of that data flow,
when the destination node of the data packet of that data flow is adjacent, making a priority designation for the next hop for data packets of that data flow being the destination node; and
determining the next hop for data packets of the data flow based on either the probabilistic determination or the priority designation.

15. The network of claim 14, wherein the network is a data center network.

* * * * *

UNITED STATES PATENT AND TRADEMARK OFFICE
CERTIFICATE OF CORRECTION

| | | |
|---|---|---|
| PATENT NO. | : 8,811,408 B2 | Page 1 of 1 |
| APPLICATION NO. | : 13/460132 | |
| DATED | : August 19, 2014 | |
| INVENTOR(S) | : Puneet Sharma et al. | |

It is certified that error appears in the above-identified patent and that said Letters Patent is hereby corrected as shown below:

In the Claims

In column 10, line 66, in Claim 14, delete "nodes:" and insert -- nodes; --, therefor.

Signed and Sealed this
Second Day of December, 2014

Michelle K. Lee
*Deputy Director of the United States Patent and Trademark Office*